Feb. 27, 1934.                L. C. HUFF                 1,948,714
                     TREATMENT OF HYDROCARBON OILS
                         Filed Nov. 15, 1930
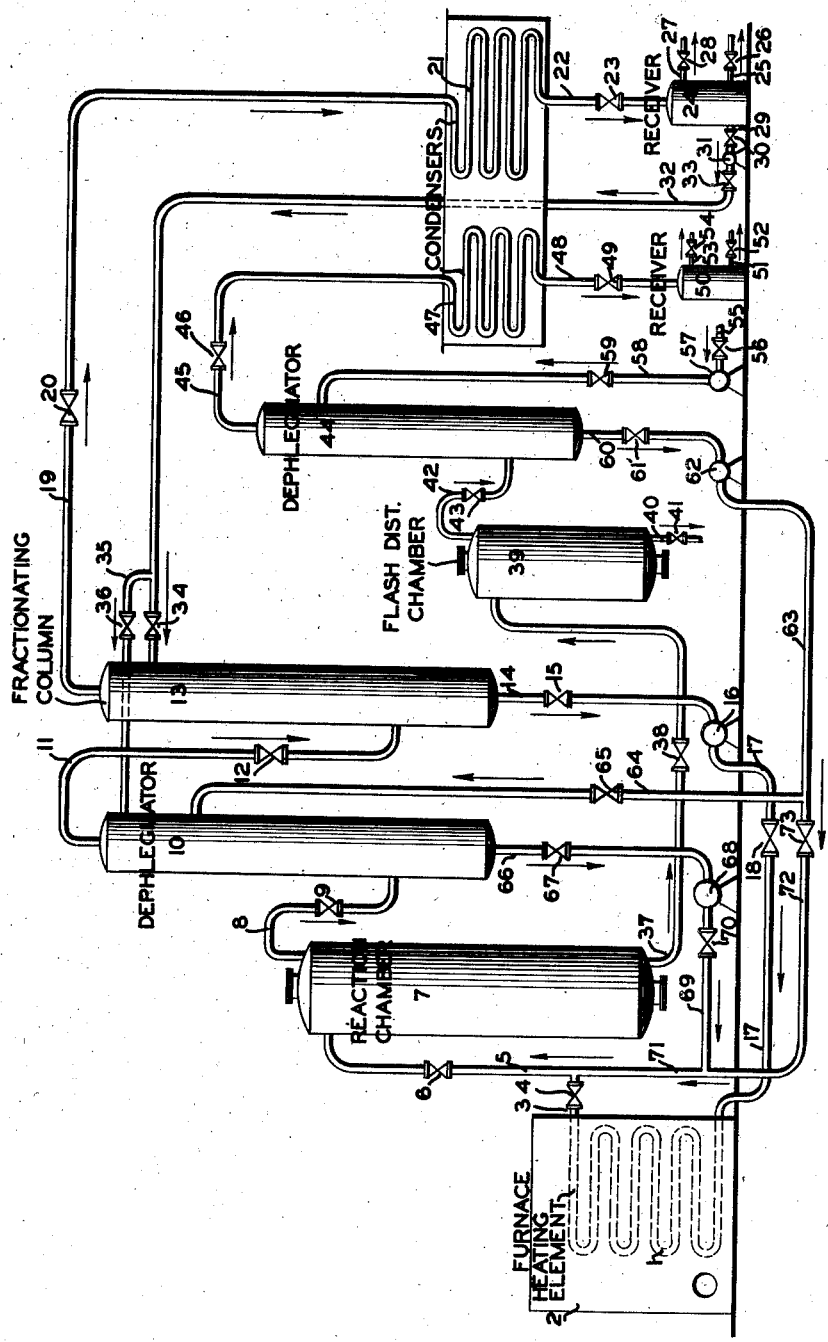
INVENTOR
LYMAN C. HUFF
BY *Frank L. Belknap*
ATTORNEY Patented Feb. 27, 1934

1,948,714

UNITED STATES PATENT OFFICE 1,948,714

TREATMENT OF HYDROCARBON OILS

Lyman C. Huff, Chicago, Ill., assignor to Universal Oil Products Company, Chicago, Ill., a corporation of South Dakota Application November 15, 1930
Serial No. 495,909

7 Claims. (Cl. 196—49)

This invention relates to the thermal decomposition or cracking of hydrocarbon oils, and refers particularly to an improved process and apparatus in which oils are advantageously treated for the maximum production of anti-knock motor fuel.

In one of its aspects, the present invention comprises subjecting a relatively refractory intermediate product from a cracking operation to relatively severe cracking conditions, thence cooling the stream of reconverted refractory oil with the raw oil charging stock for the system in combination with less refractory intermediate products from the same cracking operation and subjecting the combined heated materials to further treatment.

In its specific embodiment, the process of the present invention comprises subjecting reflux condensate from the secondary fractionating column of a cracking system to retreatment in a heating element under relatively severe cracking conditions, introducing the reconverted material into an enlarged reaction zone, subjecting vapors from said enlarged reaction zone to fractionation in a primary dephlegmator, vapors from which pass to further fractionation in a secondary fractionating column, subjecting uncondensed fractioned vapors from the secondary fractionating column to condensation and cooling and collecting the condensed distillate, subjecting unvaporized residual oil from the reaction chamber to further vaporization or flash distillation in the flash distilling chamber preferably maintained under reduced pressure, subjecting vapors from the flash distilling chamber to fractionation in a flash dephlegmator, subjecting uncondensed fractionated vapors from the flash dephlegmator to condensation and cooling and collecting the condensed distillate, supplying raw oil charging stock for the system to the flash dephlegmator in direct contact with the hot ascending vapors, returning flash condensate together with preheated raw oil from the flash dephlegmator to the primary dephlegmator of the cracking system in direct contact with the hot ascending vapors in this zone, returning reflux condensate from the primary dephlegmator of the cracking system together with flash condensate and preheated raw oil from the flash dephlegmator into the stream of heated and reconverted secondary reflux condensate from the heating element and introducing the stream of combined materials into the reaction chamber.

Other features of the invention and some variations from the process of the invention as above outlined will be apparent with reference to the accompanying diagrammatic drawing, which is not to scale, but will serve to illustrate one of the many suitable forms of apparatus in which the process of the present invention may be practiced.

Heating element 1 is located in any suitable form of furnace 2 and the oil passing through this heating element is raised to the desired conversion temperature and discharged through line 3, valve 4, line 5 and valve 6 into reaction chamber 7. Separation of vapors and unvaporized material is permitted in chamber 7. The vapors are withdrawn through line 8 and valve 9 to dephlegmator 10, where they are subjected to fractionation. The lighter uncondensed portions of the vapors from dephlegmator 10 pass through line 11 and valve 12 to fractionating column 13, where they are subjected to further fractionation, their heavier insufficiently converted and condensed portions passing through line 14 and valve 15 to pump 16, from which they are fed through line 17 and valve 18 to heating element 1 for reconversion. The light fractionated and uncondensed vapors from fractionating column 13, preferably comprising material falling within the boiling range of motor fuel, pass through line 19 and valve 20 and are subjected to condensation and cooling in condenser 21, the condensed distillate and uncondensable gas passing through line 22 and valve 23 to be collected in receiver 24. Distillate may be withdrawn from receiver 24 through line 25 and valve 26, while uncondensable gas may be released through line 27 controlled by valve 28. A portion of the condensed distillate in receiver 24 may, if desired, be withdrawn through line 29 and valve 30 to pump 31, and may be fed through line 32 and valves 33 and 34 into fractionating column 13 and/or through line 35 and valve 36 to dephlegmator 10, mingling with the hot ascending vapors in these zones and assisting their fractionation.

Unvaporized residual oil from reaction chamber 7 may be withdrawn through line 37 and valve 38 to flash distilling chamber 39, which is preferably maintained under substantially lower pressure than that maintained in reaction chamber 7. Residual oil introduced into flash distilling chamber 39 may be reduced therein to substantially dry coke but preferably, in this operation, the residual oil withdrawn from reaction chamber 7 is at a sufficiently low temperature that, after vaporization of its lighter constituents in chamber 39 upon liberation, due to pressure reduction of latent heat stored in the residual oil, a liquid residual product will remain in chamber 39 and may be withdrawn through line 40 and valve 41. Vapors evolved in chamber 39 may be passed through line 42 and valve 43 into dephlegmator 44 where they are subjected to fractionation, their lighter fractionated portion passing through line 45 and valve 46 to be subjected to condensation and cooling in condenser 47, thereafter passing through line 48 and valve 49 to be collected in receiver 50. Condensed distillate may be withdrawn from receiver 50 through line 51 and valve 52, while uncondensable gas is released through line 53, controlled by valve 54.

Raw oil charging stock for the system supplied through line 55 and valve 56 to pump 57 is fed through line 58 and valve 59 into dephlegmator 44, where it is preheated by direct contact with the hot ascending vapors which it assists to fractionate and passes, together with the condensed portion of these vapors, termed flash condensate, through line 60 and valve 61 to pump 62. Pump 62 supplies the preheated raw oil and flash condensate through lines 63, 64 and valve 65 to dephlegmator 10, where they are further heated by direct contact with the vapors in this dephlegmator which they assist to fractionate and pass, together with the condensed portion of these vapors, termed reflux condensate, through line 66 and valve 67 to pump 68. Pump 68 supplies reflux condensate from dephlegmator 10, together with that portion, if any, of the preheated raw oil and flash condensate introduced into dephlegmator 10, through line 69 and valve 70 into line 71 where this material may combine with that portion, if any, of the preheated raw oil and flash condensate from dephlegmator 44, supplied directly to line 71 through line 72 and valve 73, and is introduced into line 5 to mingle with and cool the hot reconverted secondary reflux condensate from fractionating column 13, which is fed through heating element 1.

By utilizing the raw oil charging stock and intermediate products, such as described, from the cracking system to cool the more refractory intermediate product, which is subjected to reconversion in heating element 1, I am able to maintain the relatively high temperature required for the production of high anti-knock motor fuel from said refractory intermediate product without incurring the excessive production of fixed gas and coke, which is characteristic of vapor phase or relatively high temperature cracking operations. Also by virtue of the high temperature employed in heating element 1, I am able to impart to the cooling materials, which are the less refractory intermediate products from the system and raw oil, sufficient heat to bring about their conversion in reaction chamber 7.

The pressures employed within the system may vary from subatmospheric to superatmospheric pressure as high as 1500 pounds or more per square inch. Substantially equalized pressure may be maintained throughout the system or differential pressures may be employed between any of the various elements. Preferably, reduced pressures are employed in the flash distilling system. Conversion temperatures employed may vary from 750 to 1300° F., more or less. Preferably, relatively high temperatures of the order of 1000 to 1200° F. are employed in heating element 1.

As a specific example of an operation of the process, utilizing a 28° A. P. I. gravity Mid-Continent topped crude or charging stock: secondary reflux condensate, or pressure distillate bottoms from the secondary fractionating column, are subjected in heating element 1 to a temperature of approximately 1200° F. under superatmospheric pressure of about 300 pounds per square inch. This pressure is substantially equalized upon reaction chamber 7 and dephlegmator 10, but is reduced in the secondary fractionating column and subsequent condensing and receiving equipment to about 100 pounds per square inch and in the flash distilling system to about 30 pounds per square inch. By introduction of preheated raw oil, flash condensate and reflux condensate all into transfer line 5 the stream of heated material entering reaction chamber 7 is maintained at a temperature of approximately 875° F.

From an operation such as described a yield of about 60% of motor fuel, based on the raw oil charged, having anti-knock value equivalent to a blend of 50% straight run Pennsylvania gasoline and 50% benzol, may be obtained. The residual oil produced in the flash distilling chamber may amount to some 17% of the raw oil charged, and by proper regulation of the flashing operation, this residual oil may be made to meet standard specifications for a premium fuel oil. The remaining 13%, based on the raw oil charged, is uncondensable gas and a relatively small amount of coke.

Having thus described my invention, what I claim is:

1. A cracking process which comprises maintaining hydrocarbon oil under cracking conditions of temperature and pressure in a reaction zone, separately removing vapors and unvaporized oil from the reaction zone, dephlegmating the vapors to form a reflux condensate, flash distilling the unvaporized oil by pressure reduction, dephlegmating the resultant flashed vapors thereby forming a flash reflux condensate of higher boiling point than the first-mentioned reflux condensate, passing said first-mentioned reflux condensate, unadmixed with heavier oil, through a heating zone and heating the same therein to its cracking temperature, discharging the thus heated reflux condensate into said reaction zone, and commingling said flash reflux condensate, without prior heating to cracking temperature, with the heated reflux condensate discharging from the heating zone into the reaction zone.

2. A cracking proces which comprises maintaining hydrocarbon oil under cracking conditions of temperature and pressure in a reaction zone, separately removing vapors and unvaporized oil from the reaction zone, dephlegmating the vapors to form a reflux condensate, flash distilling the unvaporized oil by pressure reduction, dephlegmating the resultant flashed vapors in direct contact with charging oil for the process thereby forming a relatively heavy mixture of preheated charging oil and flash reflux, passing the first-mentioned reflux condensate, unadmixed with heavier oil, through a heating zone and heating the same therein to its cracking temperature, discharging the thus heated reflux condensate from the heating zone into said reaction zone, and commingling said mixture, without prior heating to cracking temperature, with the heated reflux condensate discharging from the heating zone into the reaction zone whereby said mixture is raised to cracking temperature by the heat of the first-mentioned reflux condensate.

3. A cracking process which comprises maintaining hydrocarbon oil under cracking conditions of temperature and pressure in a reaction zone, separately removing vapors and unvaporized oil from the reaction zone and fractionating the vapors to form a primary reflux and a lighter secondary reflux, flash distilling the unvaporized oil by pressure reduction and dephlegmating the resultant flashed vapors thereby forming flash reflux, passing said secondary reflux, unadmixed with heavier oil, through a heating zone and heating the same therein to its cracking temperature, discharging the thus heated secondary reflux into said reaction zone, and commingling the primary reflux and the flash reflux, without prior heating to cracking temperature, with the heated secondary reflux discharged from the heating zone.

4. A cracking process which comprises maintaining hydrocarbon oil under cracking conditions of temperature and pressure in a reaction zone, separately removing primary vapors and unvaporized oil from the reaction zone, flash distilling the unvaporized oil by pressure reduction, dephlegmating the resultant flashed vapors in direct contact with charging oil for the process thereby forming a mixture of preheated charging oil and flash reflux, dephlegmating said primary vapors in direct contact with said mixture whereby heavier insufficiently cracked fractions of the primary vapors are condensed and added to the mixture, then further dephlegmating the primary vapors to form a secondary reflux condensate, passing the secondary reflux condensate, unadmixed with heavier oil, through a heating zone and heating the same therein to its cracking temperature, discharging the thus heated secondary reflux condensate from the heating zone into said reaction zone, and commingling said mixture, without prior heating to cracking temperature, with the heated secondary reflux condensate discharged from the heating zone whereby said mixture is raised to cracking temperature by the heat of the secondary reflux condensate.

5. A cracking process which comprises maintaining hydrocarbon oil under cracking conditions of temperature and pressure in a reaction zone, separately removing primary vapors and unvaporized oil from the reaction zone, flash distilling the unvaporized oil by pressure reduction, dephlegmating the resultant flashed vapors thereby forming flash reflux, dephlegmating said primary vapors in direct contact with such flash reflux to condense heavier insufficiently cracked fractions of the primary vapors and to form a mixture of the condensed fractions with the flash reflux, then further dephlegmating the primary vapors to form a secondary reflux condensate, passing the reflux condensate, unadmixed with heavier oil, through its heating zone and heating the same therein to a cracking temperature, discharging the thus heated secondary reflux condensate from the heating zone into said reaction zone, and commingling said mixture, without prior heating to cracking temperature, with the heated secondary reflux condensate discharged from the heating zone whereby said mixture is raised to cracking temperature by the heat of the secondary reflux condensate.

6. A cracking process which comprises maintaining hydrocarbon oil under cracking conditions of temperature and pressure in a reaction zone, removing vapors and unvaporized oil from the reaction zone, subjecting the vapors to primary and secondary fractionating thereby forming a primary reflux and a lighter secondary reflux, flash distilling said unvaporized oil by pressure reduction and dephlegmating the resultant flash vapors thereby forming flash reflux, passing said secondary reflux, unadmixed with heavier oil, through a heating zone and heating the same therein to cracking temperature, discharging the thus heated secondary reflux into said reaction zone, and commingling primary reflux formed by the primary fractionation and flash reflux separated from the flashed vapors, without prior heating thereof, to cracking temperature, with the heated secondary reflux discharged from the heating zone.

7. A cracking process which comprises maintaining hydrocarbon oil under cracking conditions of temperature and pressure in a reaction zone, removing vapors and unvaporized oil from the reaction zone, subjecting the vapors to primary and secondary fractionation, thereby forming a primary reflux and a lighter secondary reflux, flash distilling said unvaporized oil by pressure reduction and dephlegmating the resultant flash vapors thereby forming flash reflux, passing said secondary reflux, unadmixed with heavier oil, through a heating zone and heating the same therein to cracking temperature, discharging the thus heated secondary reflux into said reaction zone, and commingling primary reflux formed by the primary fractionation and flash reflux separated from the flashed vapors, without prior heating thereof, to cracking temperature, with the heated secondary reflux discharging from the heating zone into the reaction zone.

LYMAN C. HUFF.